Oct. 15, 1929.  J. WAHL ET AL  1,731,690
PNEUMATIC TUBE TOOL
Filed April 30, 1927

INVENTORS:
John Wahl and
Otto Melzer,
By Attorneys,
Fraser, Myers & Manley.

Patented Oct. 15, 1929

1,731,690

UNITED STATES PATENT OFFICE

JOHN WAHL, OF ROSEDALE, AND OTTO MELZER, OF HOLLIS, NEW YORK, ASSIGNORS TO A. SCHRADER'S SON, INC., OF NEW YORK N. Y., A CORPORATION OF NEW YORK

PNEUMATIC TUBE TOOL

Application filed April 30, 1927. Serial No. 187,907.

This invention relates to a tool adapted for use in the application of a tire valve casing to a pneumatic inner tube or the like. More particularly, it relates to a tool for forcing an inner tube down over a valve stem so as to lie against the enlarged foot portion thereof, after the tire valve has been inserted to a limited extent through the valve opening in the tube.

In the manufacture of mandrel-formed inner tubes for pneumatic tires and the like, it is the conventional practice before joining the tube ends together to complete the tube, to perforate the tube at the reinforced portion thereof, whereat the tire valve is to be connected thereto and to insert the tire valve through said opening from the interior of the tube.

In practice it is customary to insert the tire valve through the tube opening to but a limited extent before the tube ends are joined together, and to complete the insertion of the valve after the tube is completed. The valve opening in the tube is of smaller diameter than the tire valve so as to secure a hugging engagement of the tube around the reduced neck of the valve adjacent the foot portion thereof. Because of the small tube valve opening, the tube must be forced over the valve or the valve must be forcibly pulled through the tube. Both of these methods of inserting the valve so that the tube will seat against the valve foot where it is subsequently clamped in place between said valve foot and a bridge washer, have always proven awkward, laborious and time-consuming. In addition thereto, said methods have not proven entirely satisfactory for the reason that because of the elasticity of the tube, difficulty has been encountered in bringing the tube into hugging engagement with the valve foot without the aid of the bridge washer and clamping nut.

According to the present invention we provide a tool, through the use of which the various difficulties encountered in applying a tire valve to a tube are overcome. Moreover, the tool which we have invented is exceedingly simple in construction and operation and highly efficient in use. A preferred form of our tool consists of a tubular member having one end formed with a plurality of resiliently supported jaws which terminate in a feathered edge adapted to closely fit about the tire valve when applied thereover, and to have the jaws expanded somewhat when pressed into contact with an inner tube positioned over the valve stem. The invention also embodies other features of novelty which will be hereinafter more fully described.

The preferred embodiment of our invention is illustrated in the accompanying drawings, wherein Figure 1 is a longitudinal section of the tool of the present invention applied over a valve stem.

Figure 1:
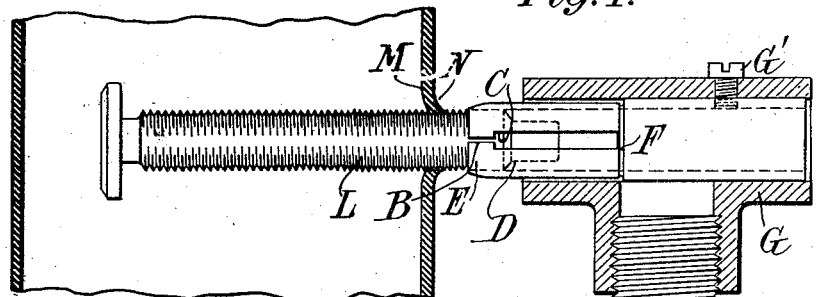
Figure 3:
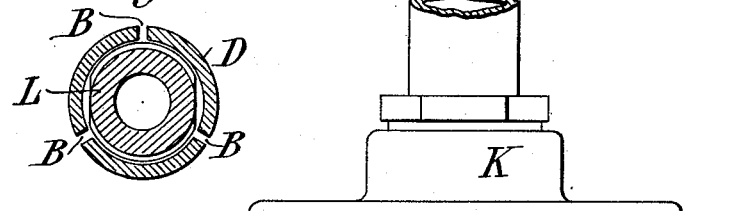
Fig. 3 is a transverse section taken along the line 3—3 of Fig. 2.

Referring to the drawings, let A indicate the tool as a whole, which is preferably formed of steel or other material having a certain degree of inherent resiliency, said tool being longitudinally slitted through one end thereof, as shown at B, and said slits terminating in longitudinally-extending slots C to provide said tool with a plurality of resilient arms D. The free end of each arm D is tapered or beveled to provide said arms with a feathered edge E. To increase the resiliency of the arms D and their tendency to resume their annular closed formation at the free ends thereof, the tube at the point of juncture of said arms with the unsplit portion is provided with an annular groove F. The internal diameter of the tool at the feathered edge E thereof is slightly smaller than the smallest diameter of valve stem over which the tool is adapted to be used, so that when the tool is applied over the valve stem the split end thereof will be slightly expanded and thus provide a close fit around said stem. The internal diameter of the remaining portion of the tool to the rear of the feathered edge, however, is of slightly larger diameter than the valve stems over which it is to be used, so that it may readily pass thereover.

The tool A, it will be obvious, may be mounted upon any form of handle, and we have herein shown it as mounted within a T-head G through the medium of a set screw G' passing through the head of the T and seating in an opening H formed in the tool. The T-head G is shown as mounted upon an upright J, which, in turn, is rigidly supported by a base member K adapted to be fastened to a work bench or the like.

The tool A, it will be understood, is intended for use in applying an inner tube or the like to a threaded valve stem of somewhat larger diameter than the valve stem opening in the tube after such valve stem has been inserted to a limited extent through said tube. Hence, the function of the tool is to push or force the inner tube down over the valve stem to seat against the foot thereof.

Figure 2:
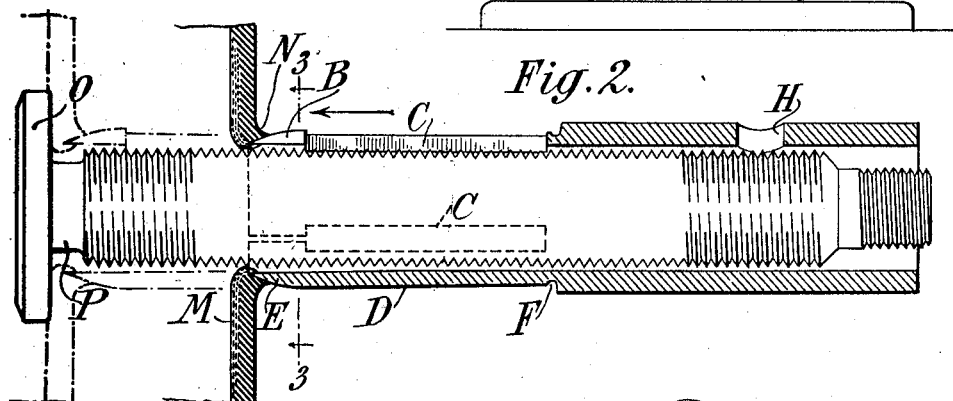
Fig. 2 is an enlarged sectional view of the tool shown in Fig. 1 in contact with the inner tube on the valve stem.
Figure 4:
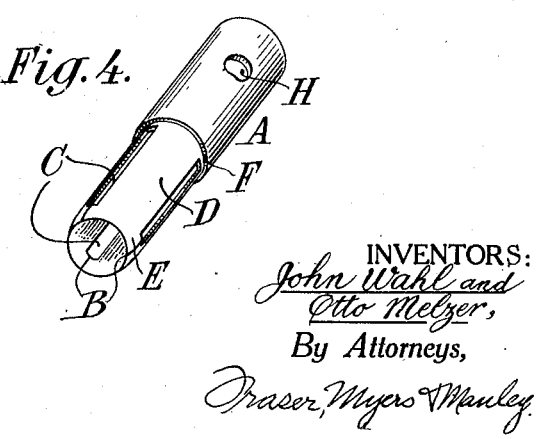
Fig. 4 is a perspective view of the tool unmounted.

In Figs. 1 and 2 of the drawings we have attempted to show the manner in which the tool functions. In Fig. 1 the tool is shown as applied over the end of a valve stem L which has been inserted to a limited extent through the reinforced portion of an inner tube M. It will be seen that the jaw-like feathered edges of the resilient arms D have been expanded outwardly, as evidenced by the increased width of the slot B in said figure. It will also be noted that the inner tube at the portion surrounding the valve opening therein is cupped outwardly, as shown at N, toward the nipple end of the valve stem, which cup-like formation, it will be understood, is the result of pushing or pulling the valve stem L through the opening in the inner tube.

In Fig. 2 the feathered edges of the resilient arms D are shown as pressed into the valve opening in the inner tube and as being expanded out of contact with the valve stem. This further expansion is brought about by the engagement of the active edge of the arms D with the annular wall which defines the valve stem opening of the inner tube intermediate the front and rear walls of the tube, as the cupped portion N of the tube rides up over the bevel or taper E of the arms D and portions of the rear wall of the tube are forced between the ends of the expandible arms and the valve stem. In this position of the tool with respect to the inner tube, it will be apparent that but a comparatively small thickness of the tube remains in engagement with the valve stem, and that upon the application of a comparatively small pressure or force, in the direction of the arrow, against said inner tube at points so close to the contacting wall of the tube with the stem, that the tube will be caused to ride down over said stem. Also, because of the point of application of the pressure on the inner tube, the latter will be caused to ride down and seat flush against the valve foot O, and upon the withdrawal of the tool, the portion of the inner tube surrounding the valve stem opening therein will snap into the reduced neck portion P of the valve stem.

According to the present invention as hereinbefore described, we have found that the speed and efficiency of applying inner tubes to valve stems are increased many fold.

While we have shown and described the preferred embodiment of our invention, it is to be understood that we do not wish to be limited to the exact structure illustrated, since modifications thereof may be resorted to without departing from the spirit of the invention.

What we claim is:

1. A tool for moving an inner tube or the like down over a threaded valve stem which has been inserted to a limited extent through the valve stem opening in the inner tube, comprising a longitudinally split tubular member having a thin edge at its split end, of somewhat smaller normal diameter than the diameter of the valve stem and adapted to be expanded to closely fit over said valve stem as the tool is pushed thereover.

2. A tool for moving an inner tube or the like down over a threaded valve stem which has been inserted to a limited extent through the valve stem opening in the inner tube, comprising a longitudinally split tubular member having a thin edge at its split end of somewhat smaller normal diameter than the diameter of the valve stem and adapted to be expanded to closely fit over said valve stem as the tool is pushed thereover, and adapted to be further expanded upon said thin edge being pushed into contact with the wall of the opening in said inner tube.

3. A tool, for moving a sheet of rubber or the like having an opening therein over a threaded member of somewhat larger diameter than the opening in the sheet, comprising a longitudinally split tubular member terminating in a feathered edge at its split end and having a normal diameter at said split end slightly smaller than the diameter of the threaded member over which it is adapted to be expanded by being pushed thereover.

4. A tool for moving an inner tube or the like down over a threaded valve stem which has been inserted to a limited extent through the valve stem opening in the inner tube, comprising a longitudinally split tubular member beveled at its split end adapted to closely fit over said valve stem and to be expanded circumferentially relatively to said valve stem by the rubber of the inner tube engaging between the inner walls of the tool and the valve stem, when said beveled end of said tool is pushed into engagement with the wall of the valve stem opening in the inner tube.

5. The method of applying an inner tube or the like to a threaded valve stem of somewhat larger diameter than the valve stem opening in the tube, which comprises inserting the valve stem to a limited extent through the valve stem opening in the tube from the interior thereof, then engaging the annular wall which defines the valve stem opening of the inner tube intermediate the walls of the tube at a plurality of points in its circumference, with a suitable tool and exerting pressure on said tool in a direction toward the foot of the valve stem to move said tool and inner tube down over the valve stem.

6. For use in moving a sheet of rubber or the like, having an opening therein over a threaded member of somewhat larger diameter than the opening in the sheet, after said threaded member has been inserted to a limited extent through said opening, a tool comprising a member having an active expandible end adapted to closely engage over the threaded member and engage the annular wall of the opening in the sheet, intermediate the walls of the sheet, at a plurality of points in its circumference as said end of the tool is moved into engagement with said sheet of rubber.

7. For use with a threaded member, and a sheet of rubber having an opening therein of smaller diameter than said threaded member, expanded thereover, a tool for engaging the wall of the opening in said sheet of rubber intermediate the faces of said sheet, said tool comprising a member closely fitting over and contacting with the threaded member and expandible out of contact therewith upon being moved into engagement with the wall of the opening in said sheet of rubber.

8. For use with a threaded member, and a sheet of rubber having an opening therein of smaller diameter than said threaded member, expanded thereover, a tool for engaging the wall of the opening in said sheet of rubber intermediate the faces of said sheet, said tool comprising a tubular member which is longitudinally split to provide arms, the free ends of which are feathered and engage over and closely contact with the threaded member and are expandible out of contact therewith upon being moved into engagement with the wall of the opening in said sheet of rubber.

9. A tool for moving a sheet of rubber or the like, having an opening therein over a threaded member of somewhat larger diameter than the opening in the sheet, comprising a plurality of resiliently supported jaws annularly arranged to closely fit over said threaded member and to be expanded radially outwardly by being moved into engagement with the sheet of rubber, said jaws terminating in beveled edges whereat they engage the sheet of rubber.

In witness whereof, we have hereunto signed our names.

JOHN WAHL.
OTTO MELZER.